July 1, 1952  H. V. JAMES  2,601,810
TIRE TRUING MACHINE

Filed Nov. 7, 1949  3 Sheets-Sheet 1

INVENTOR.
HAROLD V. JAMES
BY
ATTORNEY

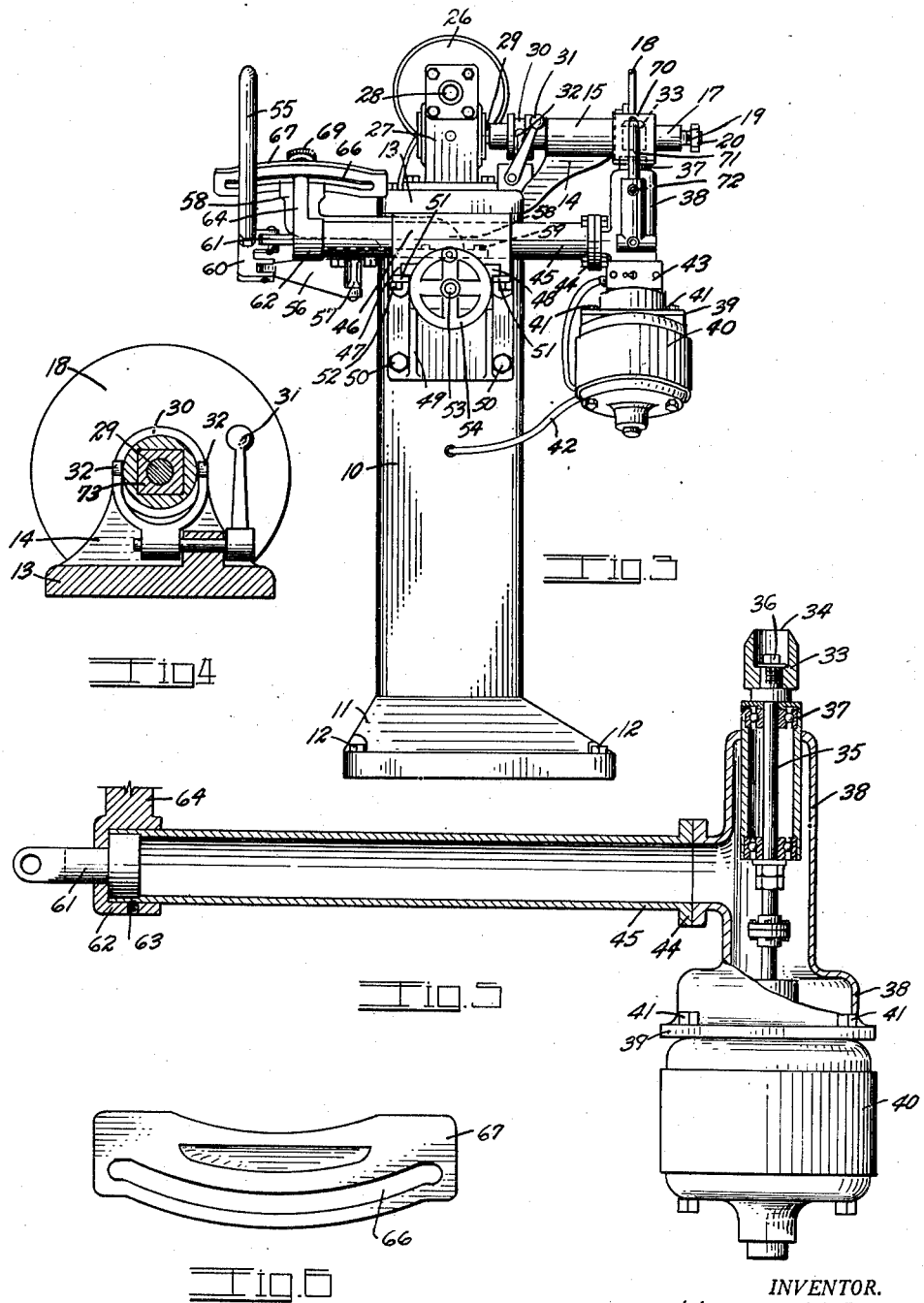

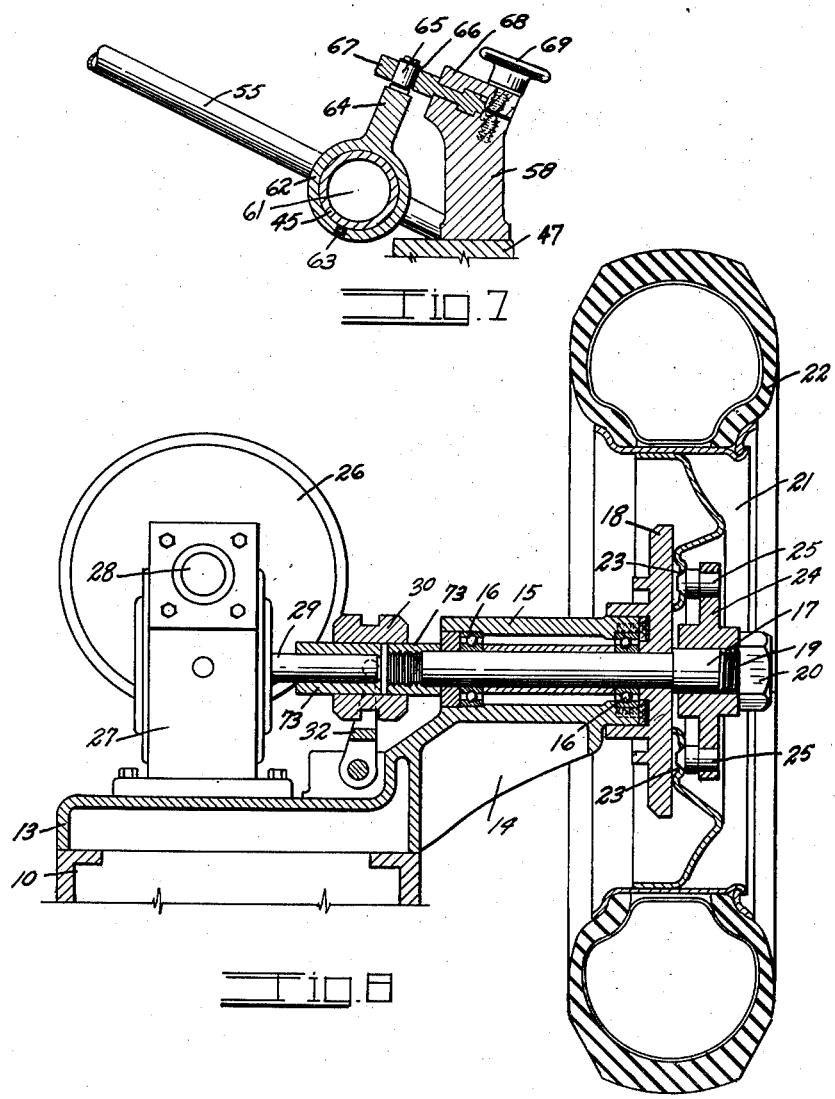

Patented July 1, 1952

2,601,810

UNITED STATES PATENT OFFICE 2,601,810

TIRE TRUING MACHINE

Harold V. James, Littleton, Colo.

Application November 7, 1949, Serial No. 125,995

6 Claims. (Cl. 90—13.3)

This invention relates to a wheel and tire truing and balancing machine, and has for its principal object the provision of a simple and highly efficient machine which will smoothly and accurately remove tread rubber from the high portions or "bumps" of an inflated and mounted automotive tire so as to bring the tire to a perfectly circular contour so as to eliminate vibration and uneven wear of the tire.

Another object of the invention is to provide a tire tread truing machine in which accurate patterns for various types and sizes of tires may be placed, and which will follow the pattern to bring the tire tread to an accurate cross-sectional contour.

A further object of the invention is to combine with a tire tread shaving or truing machine means whereby the complete wheel and tire can be allowed to rotate freely in order that it may be accurately balanced, if necessary, after the truing operation.

A still further object is to provide means for accurately and rapidly mounting wheels of any type or make upon the improved machine.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 3 is a front view thereof;

Fig. 4 is a detail cross section, taken on the line 4—4, Fig. 2;

Fig. 5 is an enlarged, longitudinal section through a tubular mounting shaft employed on the improved wheel balancing machine;

Fig. 6 is a similarly enlarged detail view of a typical pattern plate employed on the machine;

Fig. 7 is a detail section, taken on the line 7—7, Fig. 2; and

Fig. 8 is a similar section, taken on the line 8—8, Fig. 2.

Figures 1, 2:
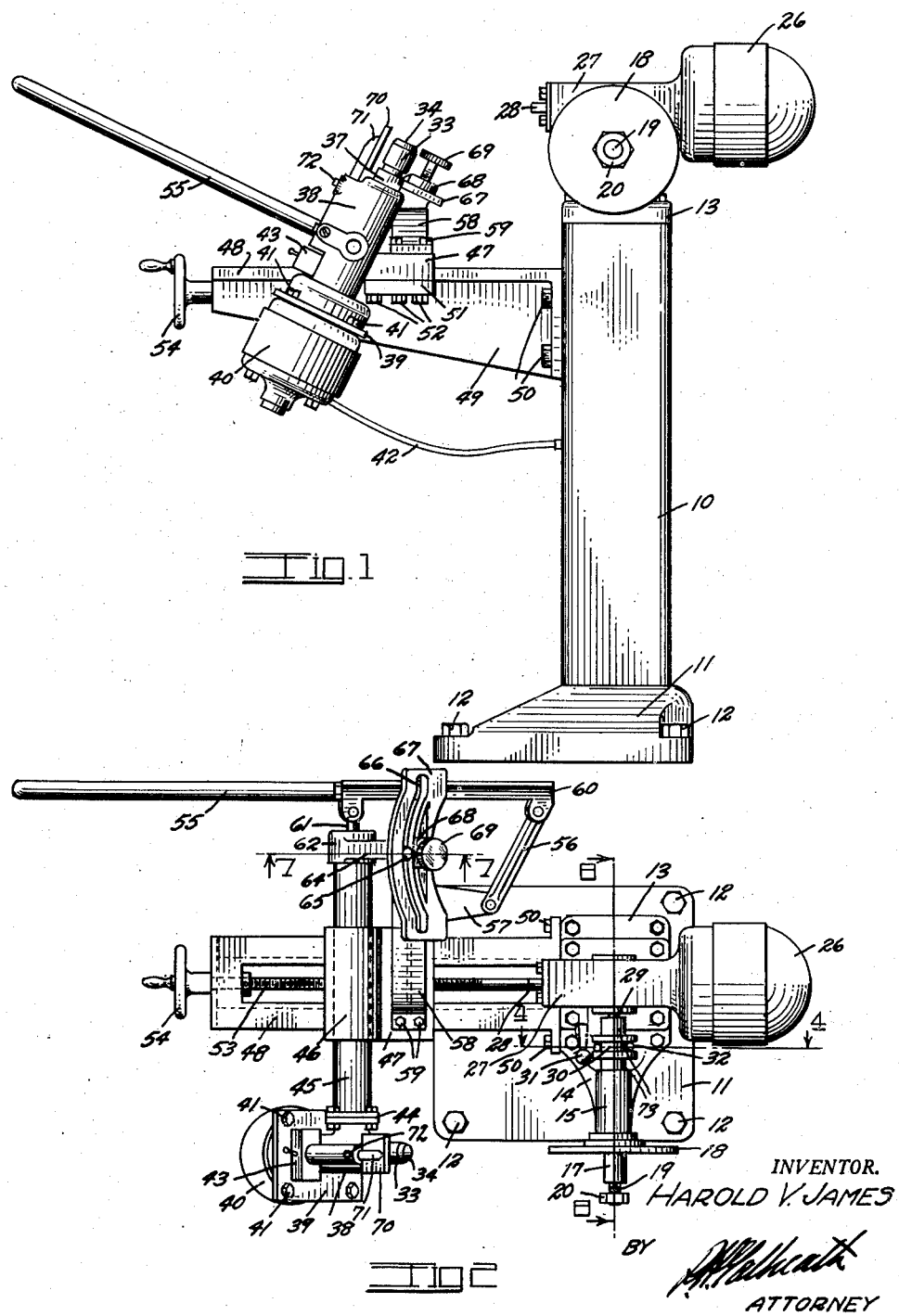
Fig. 1 is a side view of the improved tire and wheel balancing machine.
Fig. 2 is a top view thereof.

A typical automotive wheel is indicated at 21 on the drawing with its surrounding casing or tire at 22. Wheels of this type are provided with stud holes 23 which are countersunk to receive the conventional conical wheel attachment nuts.

The improved wheel and tire balancing machine is mounted on a supporting pedestal 10 having a floor base 11 which may be attached to a floor or other supporting surface by means of suitable screws or bolts 12. The pedestal 10 supports a cap casting 13 from which a bearing arm 14 projects to support a shaft bearing sleeve 15.

The bearing sleeve 15 contains suitable antifriction bearings 16 in which a wheel shaft 17 is freely rotatable. A wheel disc 18 is mounted on the shaft 17 adjacent the outer end of the bearing sleeve 15 and the shaft terminates in a threaded stud 19 for receiving a clamping nut 20.

The wheel 21 is placed on the shaft 17 and is clamped against the disc 18 by means of a clamping plate 24 and the nut 20. The clamping plate 24 is provided with conical studs 25 positioned to enter and automatically center themselves in the countersunk stud holes 23. A plurality of the different clamping plates 24 are provided with each machine. The plates having various numbers and various spacings of the conical studs 25 so as to accommodate wheels of various types, makes, and designs.

During the truing or shaving operation, the wheel 21 is rotated by means of an electric motor 26 which is supported from a worm gear box 27 mounted on the cap casting 13. The shaft of the motor, indicated at 28, projects through the gear box 27 to receive a flexible shaft (not shown) for operating buffing tools and other apparatus.

The gearing in the gear box rotates a drive shaft 29 at reduced motor speed. The extremity of the drive shaft is in axial alignment with the extremity of the wheel shaft 17. The adjacent extremities of the two shafts 29 and 17 carry non-circular, preferably square, clutch collars 73. A clutch sleeve 30 is slidably mounted on the clutch collars 73 so that it may be slid from a released position on the shaft 29 to an engaged position overlapping the shaft 17. The sleeve 30 is moved through the medium of a clutch handle 31 which actuates a clutch yoke 32 into engagement with the clutch sleeve 30.

The actual tread shaving is done by means of a cylindrical cup-shaped cutter 33 having an annular sharpened edge 34. The cutter 33 is axially mounted on the extremity of a cutter shaft 35 by means of a mounting screw 36. The cutter shaft 35 is journalled in suitable bearings in a bearing sleeve 37 extending into a bearing member 38. The lower extremity of the bearing member 38 terminates in an attachment flange 39 to which a second electric motor 40 is attached by means of suitable cap screws 41. The shaft of the motor 40 is coupled to the cutter shaft 35. Current is fed to the motor through a flexible electrical conduit 42 controlled by means of an electrical switch 43.

The bearing member 38 is mounted on a supporting flange 44 on the extremity of a tubular cross shaft 45. The tubular cross shaft is rotatably and slidably mounted in an elongated bearing 46 formed on a crosshead 47 which is longitudinally slidable on a pair of parallel crosshead tracks 48 supported from a track bracket 49 mounted on the side of the pedestal 10 by means of suitable mounting screws 50. The cross head 47 is held in place on the tracks 48 by means of flange plates 51 and clamp screws 52.

A guard plate 70 is adjustably supported upon a plate post 71 immediately ahead of the cutter 33 to protect the operator from flying particles and over which the cutaway ribbon or rubber depends so as to prevent the latter from wrapping and winding about the cutter shaft. The plate post 71 may be adjusted to the desired height by means of a suitable set screw 72.

A threaded shaft 53 is threaded through the crosshead 47 and is rotatably supported between the tracks 48. The shaft 53 terminates in a hand wheel 54 by means of which it may be rotated to cause the crosshead 47 to travel along the tracks 48.

The tubular cross shaft 45 may be slid back and forth through the bearing 46 by means of a hand lever 55 which is inserted in a lever member 60. The lever member 60 is hingedly connected to the extremity of a connecting link 56 extending to a link bracket 57, mounted on the crosshead 47, and to a projecting stud 61 in the extremity of the tubular shaft 45. The stud is rotatable with reference to the shaft 45 and is held in place therein by means of a shaft cap 62 fixedly secured on the extremity of the shaft 45 by means of suitable set screws 63, or in any other desired manner. It can be seen that when the lever 55 is swung back and forth, it will cause the shaft 45 to slide back and forth in the bearing 46.

It will also be seen that the shaft 45 is free to rotate without rotating the lever 55. Rotation is impared to the shaft 45 by means of a pattern arm 64 projecting upwardly from the cap 62. The pattern arm 64 terminates in a cam follower roller 65 which travels in a pattern slot 66 in a selected pattern plate 67 secured upon a bracket arm 58 by means of a clamping jaw 68 and a clamp screw 69. The bracket arm 58 is mounted upon the crosshead 47 by suitable cap screws 59.

Operation

The wheel and tire to be trued is mounted on the wheel shaft 17 by means of the matching clamping plate 24 and nut 20. The proper pattern plate 67 for the particular tire is selected and placed over the follower roller 65 and thence under the clamping jaw 68, where it is secured by means of the clamp screw 69.

The motors 26 and 40 are now started to cause the wheel and tire to rotate downwardly on the forward side, and to rapidly rotate the cutter 33. The hand wheel 54 is now rotated to advance the cutter toward the surface of the rotating tire tread until the highest portions of the latter engage the cutter. The operator now slowly swings the lever 55 sidewardly, causing the roller 65 to follow the contour of the pattern slot 66, and causing the cutter to describe a corresponding arc about the tire tread so as to cut or shave away the eccentric high portions of the tire tread. The operation is continued by careful adjustment of the hand wheel 54 and sideward movement of the lever 55 until a perfect, uniform, circular tread surface has been obtained.

The cutter is now withdrawn from the tread and the clutch handle 31 is swung to release the wheel shaft 17 from the drive shaft 29. This will allow the wheel to coast freely so that its balance may be readily determined and adjusted by means of the usual counterbalancing weights.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A machine for truing tires while in place on a wheel comprising: a wheel shaft; means for mounting a wheel on said wheel shaft; a motor adapted to rotate said wheel shaft; a track member extending at right angles to the axis of said wheel shaft; a crosshead slidably mounted on said track member; means for moving said crosshead toward and away from said wheel shaft; a cross shaft slidably and rotatably mounted in said crosshead parallel to said wheel shaft; a cutter shaft extending transversely of one extremity of said cross shaft; a rotary cutter mounted on one extremity of said cutter shaft; a motor connected with the other extremity of said cutter shaft; and means for rotating said cross shaft to cause said cutter to swing toward and away from said wheel shaft.

2. A machine for truing tires while in place on a wheel comprising: a wheel shaft; means for mounting a wheel on said wheel shaft; a motor adapted to rotate said wheel shaft; a track member extending at right angles to the axis of said wheel shaft; a crosshead slidably mounted on said track member; means for moving said crosshead toward and away from said wheel shaft; a cross shaft slidably and rotatably mounted in said crosshead parallel to said wheel shaft; a cutter shaft extending transversally of one extremity of said cross shaft; a rotary cutter mounted on one extremity of said cutter shaft; a motor connected with the other extremity of said cutter shaft; a pattern member carried from said crosshead; a pattern arm projecting from said cross shaft into engagement with said pattern member; and means for moving said cross shaft longitudinally to cause the latter to rotate in correspondence with the contour of said pattern.

3. A machine for truing tires while in place on a wheel comprising: a wheel shaft; means for mounting a wheel on said wheel shaft; a motor adapted to rotate said wheel shaft; a track member extending at right angles to the axis of said wheel shaft; a crosshead slidably mounted on said track member; means for moving said crosshead toward and away from said wheel shaft; a cross shaft slidably and rotatably mounted in said crosshead parallel to said wheel shaft; a cutter shaft extending transversally of one extremity of said cross shaft; a rotary cutter mounted on one extremity of said cutter shaft; a motor connected with the other extremity of said cutter shaft; a bracket member extending from said crosshead; a contoured pattern plate; clamping means for clamping said pattern plate to said bracket member; a pattern arm extending from said cross shaft into engagement with said pattern plate; and a hand lever hingedly connected at its inner extremity to said crosshead and being hinged intermediate its extremities to said cross shaft for moving the latter longitudinally to cause said pattern arm to follow said pattern.

4. A machine for truing tires while in place on a wheel comprising: a wheel shaft; means for mounting a wheel on said wheel shaft; a motor adapted to rotate said wheel shaft; a track member extending at right angles to the axis of said wheel shaft; a crosshead slidably mounted on said track member; means for moving said crosshead toward and away from said wheel shaft; a cross shaft slidably and rotatably mounted in said crosshead parallel to said wheel shaft; a cutter shaft extending transversally of one extremity of said cross shaft; a rotary cutter mounted on one extremity of said cutter shaft; a motor connected with the other extremity of said cutter shaft; means for rotating said cross shaft to cause said cutter to swing toward and away from said wheel shaft; and means for disconnecting said wheel shaft from said first motor so that said wheel may rotate freely under the influence of gravity.

5. A machine for truing tires while in place on a wheel comprising: a wheel shaft; means for mounting a wheel on said wheel shaft; a motor adapted to rotate said wheel shaft; a track member extending at right angles to the axis of said wheel shaft; a crosshead slidably mounted on said track member; means for moving said crosshead toward and away from said wheel shaft; a cross shaft slidably and rotatably mounted in said crosshead parallel to said wheel shaft; a bearing member mounted on one extremity of said cross shaft and extending transversally of the axis thereof; a motor secured on one extremity of said bearing member; a rotary cutter mounted on the other extremity thereof; means for transmitting rotation from said motor to said cutter; and means for swinging said bearing member in a predetermined path as said cross shaft is moved longitudinally.

6. A machine for truing tires while in place on a wheel comprising: a wheel shaft; means for mounting a wheel on said wheel shaft; a motor adapted to rotate said wheel shaft; a track member extending at right angles to the axis of said wheel shaft; a crosshead slidably mounted on said track member; means for moving said crosshead toward and away from said wheel shaft; a cross shaft slidably and rotatably mounted in said crosshead parallel to said wheel shaft; a bearing member mounted on one extremity of said cross shaft and extending transversally of the axis thereof; a motor secured on one extremity of said bearing member; a rotary cutter mounted on the other extremity thereof; means for transmitting rotation from said motor to said cutter; a pattern arm projecting radially from the other extremity of said cross shaft; a contoured pattern supported from said crosshead in the path of said pattern arm so that the said cross shaft will be rotated in consequence of the contour of said pattern as the pattern arm moves therealong; and means for moving said cross shaft longitudinally.

HAROLD V. JAMES.

REFERENCES CITED

The following references are of record in the file of this patent:

UNITED STATES PATENTS

| Number | Name | Date |
|---|---|---|
| 48,283 | Jillson | June 20, 1865 |
| 329,381 | Fay | Oct. 27, 1885 |
| 1,561,861 | Kmentt | Nov. 17, 1925 |
| 1,891,789 | Wheeler | Dec. 20, 1932 |
| 1,968,242 | Birch | July 31, 1934 |
| 2,009,524 | Schmidt | July 30, 1935 |
| 2,041,818 | Connelly | May 26, 1936 |
| 2,042,509 | Connelly | June 2, 1936 |
| 2,200,575 | Haskins | May 14, 1940 |
| 2,200,730 | Smallwood et al. | May 14, 1940 |